United States Patent [19]

Newton et al.

[11] Patent Number: 4,934,139
[45] Date of Patent: Jun. 19, 1990

[54] TURBOFAN GAS TURBINE ENGINE

[75] Inventors: Arnold C. Newton; Richard G. Patilla, both of Derby, England

[73] Assignee: Rolls-Royce plc, London, England

[21] Appl. No.: 405,052

[22] Filed: Sep. 8, 1989

Related U.S. Application Data

[63] Continuation of Ser. No. 217,056, Jul. 8, 1988, abandoned, which is a continuation of Ser. No. 49,593, May 14, 1987, abandoned.

[30] Foreign Application Priority Data

Jul. 2, 1986 [GB] United Kingdom ............... 8616154

[51] Int. Cl.$^5$ ............................................. F02K 3/04
[52] U.S. Cl. ................................. 60/226.1; 137/15.1; 244/53 B
[58] Field of Search ................. 60/226.1, 39.162, 268, 60/262; 137/15.1, 15.2; 244/53 B

[56] References Cited

U.S. PATENT DOCUMENTS

| | | | |
|---|---|---|---|
| 3,348,379 | 10/1967 | Wilde et al. | 60/226.1 |
| 3,363,419 | 1/1968 | Wilde | 60/226.1 |
| 3,618,323 | 11/1971 | Needham | 60/226.1 |
| 4,389,227 | 6/1983 | Hobbs | 244/53 B |
| 4,767,270 | 8/1988 | Seidel . | |

FOREIGN PATENT DOCUMENTS

| | | | |
|---|---|---|---|
| 2539297 | 3/1976 | Fed. Rep. of Germany | 137/15.1 |
| 588096 | 5/1947 | United Kingdom | 60/226.1 |
| 589099 | 6/1947 | United Kingdom . | |
| 978041 | 12/1964 | United Kingdom . | |
| 1195027 | 6/1970 | United Kingdom . | |
| 1330904 | 9/1973 | United Kingdom . | |
| 1551881 | 9/1979 | United Kingdom . | |
| 1557817 | 12/1979 | United Kingdom . | |

Primary Examiner—Donald E. Stout
Attorney, Agent, or Firm—Cushman, Darby & Cushman

[57] ABSTRACT

The present invention relates to turbofan gas turbine engines. In conventional high bypass ratio turbofans the large variations in the free air stream flowing into the fan duct inlet is accommodated by a thick lip and a long, thick fan casing to prevent air flow separation from the outer surface of the fan casing, but produces a heavy fan casing and large drag values. In the invention a turbofan comprises a core engine which has a core casing, and a fan assembly positioned downstream of the core engine. The fans operate in a fan duct defined by the fan casing. The core casing has an external form upstream of the fan duct inlet which affects the airflow streamlines flowing into the fan duct inlet to cause it to adopt a flow path which is near alignment with the length of the fan casing to reduce fan casing weight, length and drag.

1 Claim, 4 Drawing Sheets

TURBOFAN GAS TURBINE ENGINE

This is a continuation of application Ser. No. 07/217,056, filed July 8, 1988, now abandoned which is a continuation of application Ser. No. 07/049,593, filed May 14, 1987 now abandoned.

The present invention relates to turbofan gas turbine engines and in particular to turbofan gas turbine engine in which the fan assembly is positioned downstream of the core engine.

Turbofan gas turbine engines which are of the high bypass ratio type have very large variations in size of the entering air stream tube between cruise and static conditions when installed on an aircraft.

In conventional high bypass ratio turbofan gas turbine engines, in which the fan assembly is positioned upstream of the core engine, the variation in size of the entering air stream tube flowing into the fan duct inlet is accommodated by having a thick contoured lip followed by a long fan casing designed to prevent air flow separation from the fan casing.

The lip has a sufficient internal depth to prevent flow separation from the interior surface of the lip of the fan casing during static conditions when the entering air stream tube is infinite and air is drawn from completely around the lip, and has a sufficient external depth to prevent flow separation from the exterior surface of the lip of the fan casing during cruise conditions when the entering air stream tube is smaller and some air has to spill over the exterior surface of the intake.

In a high bypass ratio turbofan gas turbine engine, the larger airflows and larger engine sizes produce larger drag penalties which considerably offsets the performance gains of the engine cycle.

The present invention seeks to provide a turbofan gas turbine engine in which the fan assembly is positioned downstream of the core engine and in which the fan casing is relatively shorter to reduce drag values and fan casing weight.

Accordingly the present invention provides a turbofan gas turbine engine comprising a core engine having a core casing, a fan assembly positioned at the downstream end of the engine or downstream of the core engine, the fan assembly having at least one fan operating within a fan duct defined in part by a fan casing, the core casing having an external form upstream of the fan duct inlet which at least in one mode of operation affects the airflow streamlines in the vicinity of the fan duct inlet such as to cause it to adopt a flow path which is near alignment with the length of the fan casing prior to reaching said fan casing.

The core casing has a waisted form whose minimum diameter is substantially in the same plane as the fan duct inlet.

The fan casing may have a lip positioned at its upstream end, the lip may have a relatively small external depth.

The fan assembly may comprise an upstream fan, and a downstream fan driven by a power turbine.

The upstream and downstream fans may be arranged to be rotatably driven in opposite directions by the power turbine.

The present invention will be more fully described by way of reference to the accompanying drawings, in which.

Figure 1:
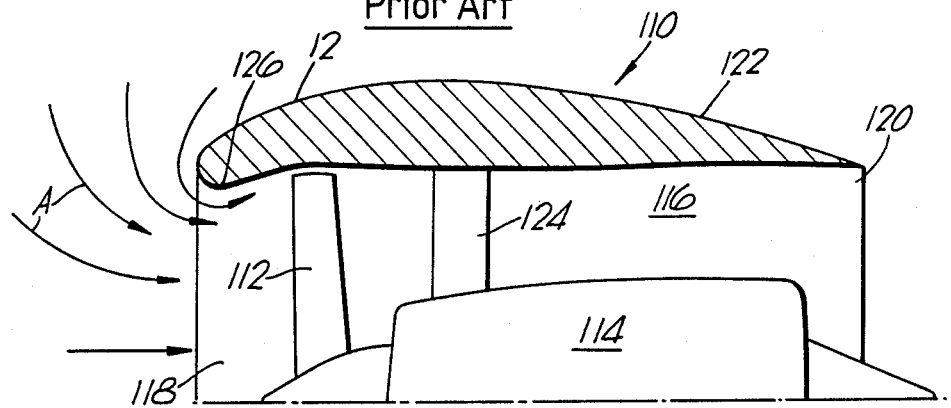
FIGS. 1 and 2 are part cross sectional views of a prior art turbofan gas turbine engine showing the air flow streamlines for static and cruise conditions respectively.
Figure 2:
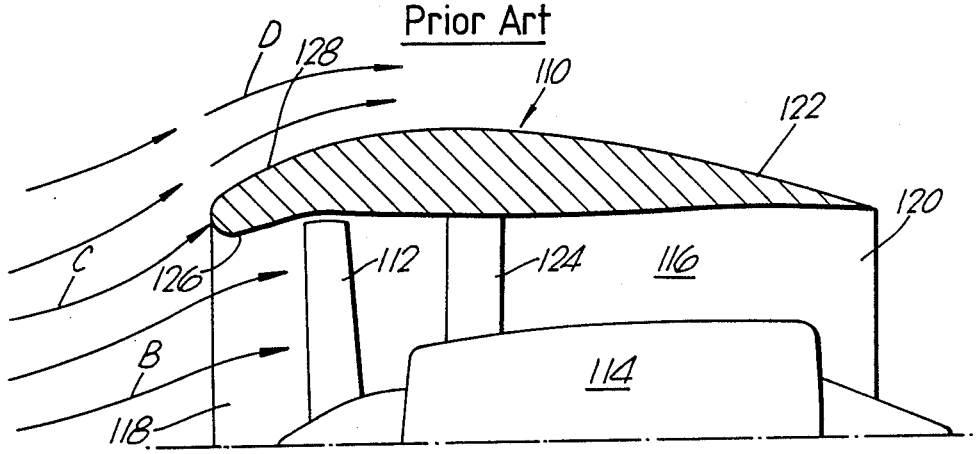

A conventional turbofan 110 is shown in FIGS. 1 and 2 and comprises a fan 112 and a core engine 114, the fan 112 being positioned upstream of the core engine 114. The core engine is conventional and drives the fan. The blades of the fan are arranged to rotate within a fan duct 116 which has an inlet 118 and an outlet 120 and is defined by a fan casing 122. The fan casing 122 is carried from the core engine by a plurality of struts or vanes 124 which extend radially from the core engine casing to the fan casing.

In operation a turbofan gas turbine engine which has a high bypass ratio, as is shown in FIGS. 1 and 2, has a very large variation in the entering stream tube size required by the fan assembly between cruise and static or low speed conditions. The airflow streamlines entering the fan duct inlet 118 are denoted by A for the static condition in FIG. 1 when the entering stream tube size is infinite and by B for the cruise condition in FIG. 2 when a much smaller stream tube is required by the fan. The bounding stream tube of the airflow entering the fan duct inlet is denoted by C and the airflow spilling over the fan casing is denoted by D.

The variation in the size of the fan stream tube is accommodated by having a thick internal contoured lip 126 followed by a forebody 128 on the fan casing 122. The lip has sufficient depth to prevent flow separation from the interior surface of the lip of the fan casing during static operation, when air is drawn all around the intake and not only from immediately upstream of the fan inlet. The forebody 128 also has a sufficient external depth and profile to prevent flow separation from the exterior surface of the fan casing during cruise conditions when air is spilt over the intake.

The forebody is designed to ensure that the spillage airflow D remains attached to the outer surface of the fan casing 122 to prevent separation and hence large drag values especially during cruise condition. As a result the forebody and fan casing are relatively long and thick because of the requirement to change the flow direction smoothly and gradually, and this increases engine weight, and produces large drag values which considerably offset the performance benefits of the turbofan gas turbine engine cycle.

Figure 3:
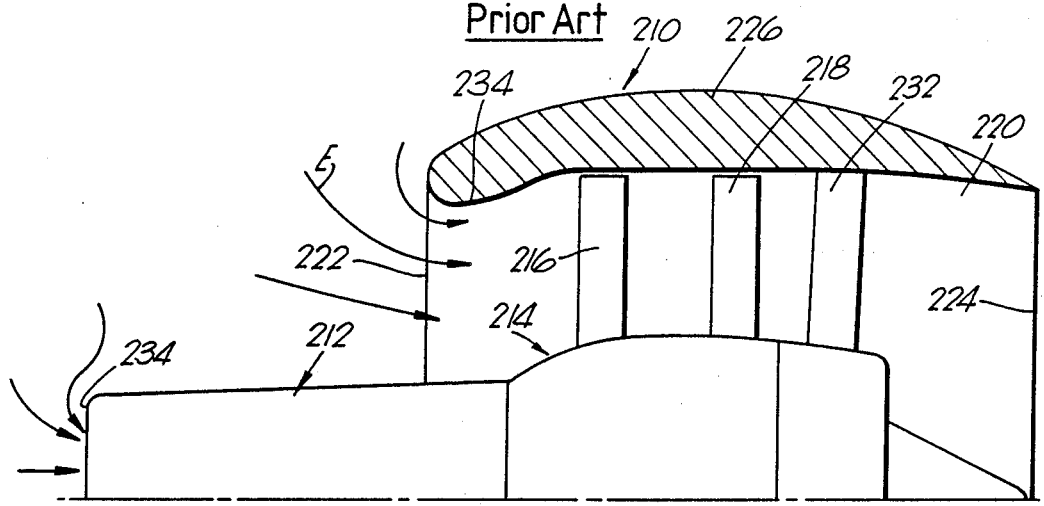
FIGS. 3 and 4 are part cross sectional views of a further prior art turbofan gas turbine engine showing the air flow streamlines for static and cruise conditions respectively.
Figure 4:
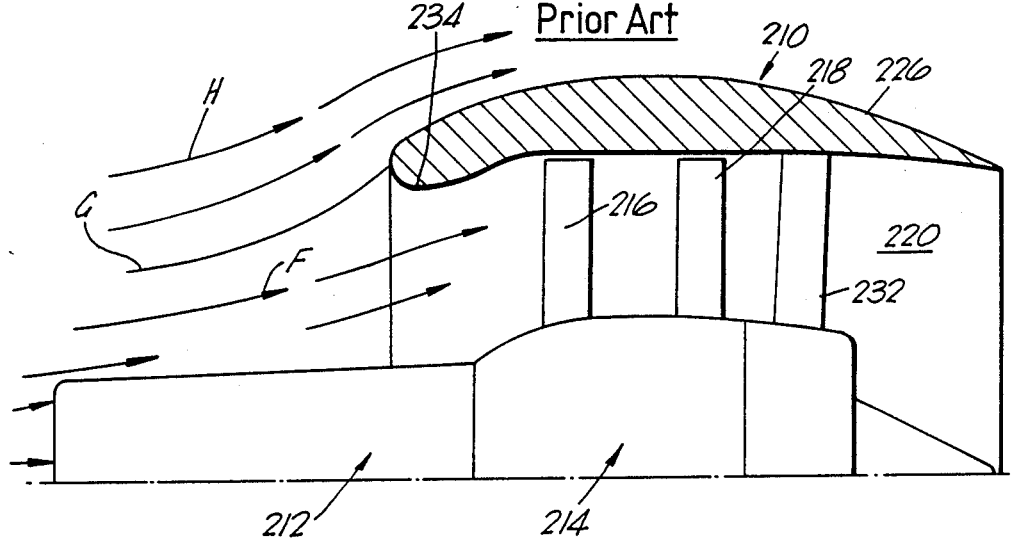

A high bypass ratio turbofan 210 in which a fan assembly 214 is positioned at the downstream end of the engine, and may be positioned downstream of a core engine 212, is shown in FIGS. 3 and 4. The blades of the fan are arranged to rotate within a fan duct 220 which has an inlet 222 and an outlet 224 and is defined by a fan casing 226. The fan casing 226 is secured to the core engine 212 by a plurality of struts or vanes 232 which extend radially from the core engine casing to the fan casing.

In operation the airflow streamlines entering the fan duct inlet are denoted by E for the static conditions, in FIG. 3, when an infinite stream tube is required by the fan, and by F for the cruise condition in FIG. 4, when a smaller stream tube size is required by the fan. The lip of the fan casing has a sufficient internal depth to prevent internal flow separation at take off, and a sufficient external depth to prevent external flow separation at cruise.

The bounding stream tube of the air flowing into the fan duct inlet is denoted by G, and the flow spilling over the fan casing is denoted by H for cruise conditions.

This again produces a relatively thick and long fan casing, and these problems are increased due to the use of larger airflows and larger engine diameters.

Figure 5:
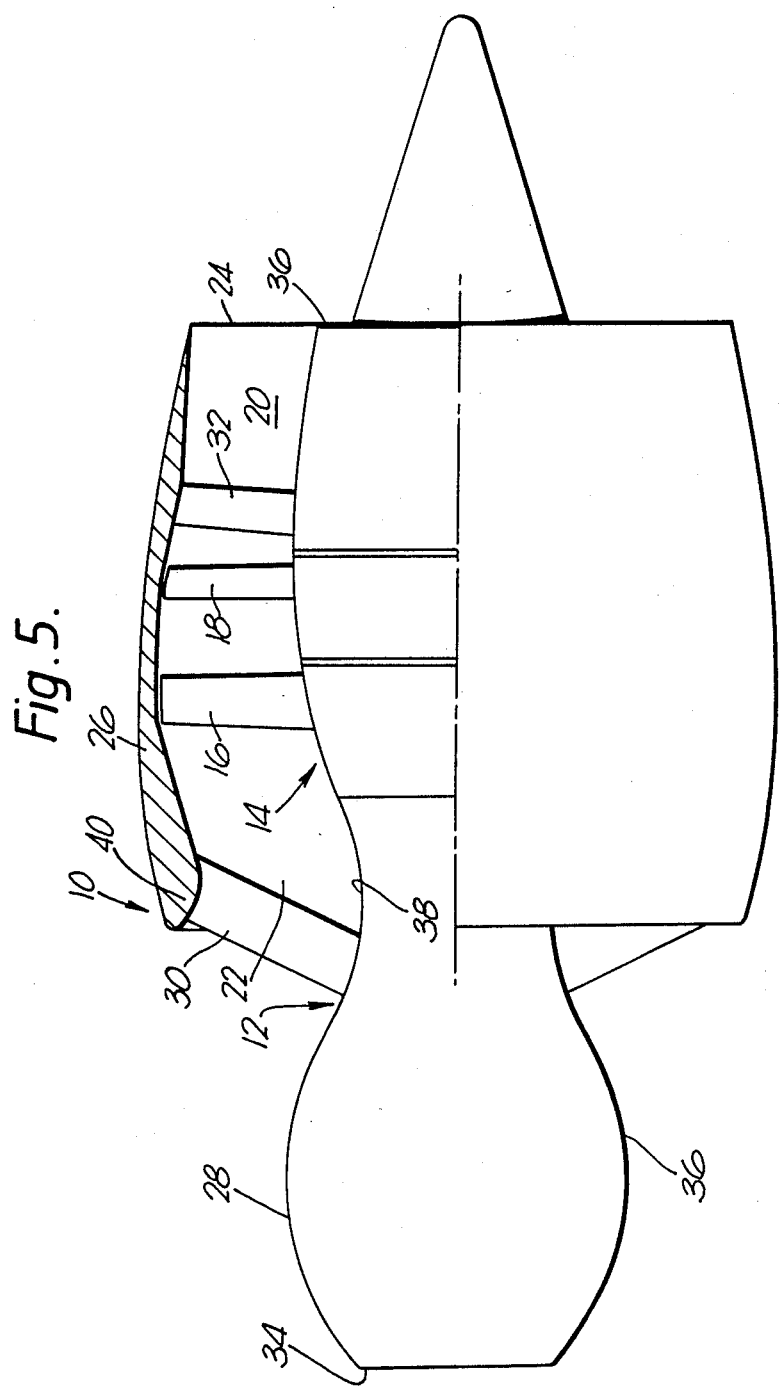
FIG. 5 shows a part cross-sectional view of a turbofan gas turbine engine according to the present invention.
Figure 6:
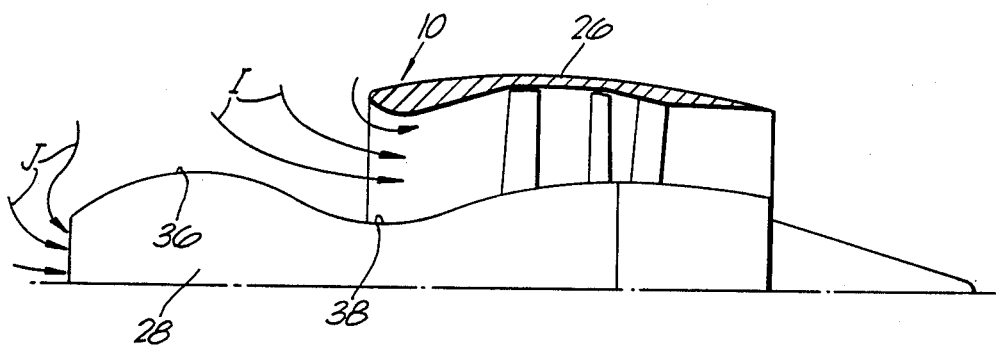
FIGS. 6 and 7 show part cross sectional views of a turbofan gas turbine engine as shown in FIG. 5 showing the air flow streamlines for static and cruise conditions respectively.
Figure 7:
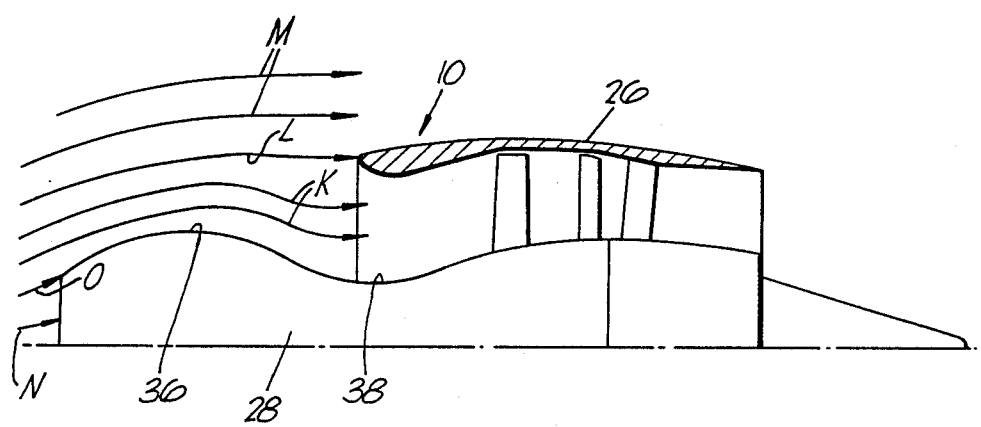

A turbofan gas turbine engine 10 according to the invention is shown in FIGS. 5, 6 and 7 and comprises a core engine 12, and a fan assembly 14, the fan assembly being positioned at the downstream end of the gas turbine engine and for example is positioned downstream of the core engine. The core engine 12 is conventional and may comprise in flow series a compressor or compressors, a combustor and a turbine or turbines. The core engine supplies hot gases to drive the fan assembly, which comprises one or more fans, in this example an upstream fan 16 and a downstream fan 18, which are driven by a power turbine. The power turbine is driven by exhaust gases from the core engine, and may be arranged to drive the fans in the same direction of rotation or in opposite directions of rotation, the exhaust gases flowing through outlet 36. The blades of the upstream and downstream fans 16,18 respectively are arranged to rotate within a fan duct 20 which has an inlet 22 and an outlet 24 and is defined partially by a fan casing 26.

The core engine 12 has a core casing 28 which encloses the core engine 12 and has an inlet 34. The core engine 12 is in part supported from the fan casing 26 by a plurality of struts or vanes 30 extending from the upstream end of the fan casing. The fan assembly 14 is supported from the fan casing 26 by a plurality of struts or vanes 32 extending from the downstream end of the fan casing.

The core casing 28 has a first portion 36 positioned upstream of the fan duct inlet 22, which is aerodynamically contoured and which has a relatively large diameter, and a second portion 38 positioned downstream of the first portion 36 substantially in the same plane as the fan duct inlet 22, and which has a relatively small diameter. First and second portions merge smoothly to retain the airflow. Thus the core casing has a waisted form whose minimum diameter is in the same plane as the fan duct inlet.

The fan casing 26 has a lip 40 at its upstream end to ensure the airflow streamlines remain attached to the fan casing at static and cruise conditions.

In operation the airflow streamlines entering the fan duct inlet 22 and core engine inlet 34 are denoted by I and J respectively for the static conditions, in FIG. 6, when an infinite stream tube is required by the fan or fans, and the airflow streamlines entering the fan duct inlet 22 and core engine inlet are denoted by K and N respectively for the cruise condition, in FIG. 7, when a smaller stream tube size is required by the fan or fans and core engine. The bounding stream tubes of the airflow entering the fan duct inlet and core engine inlets are denoted by L and O respectively, and the spillage flow over the fan casing is denoted by M for the cruise condition.

The second portion 38 of the core casing 28 is reduced to a minimum diameter to allow the maximum possible internal lip depth of the fan casing to prevent internal flow separation at static conditions, and to allow a minimum external fan casing diameter.

The contoured first portion 36 of the core casing 28 has a relatively large diameter so that the external form of the core casing upstream of the fan duct inlet 22 affects the entering stream tube flowing through the fan duct inlet such as to cause it to adopt a flow path which is near alignment with the length of the fan casing prior to reaching the fan casing during cruise conditions.

The bounding stream tube L of the entering stream tube flowing into the fan duct inlet during cruise conditions is nearer to alignment with the length of the fan casing, than the prior art, and provides a straighter dividing stream line ahead of the fan casing lip between the airflow streamlines K entering the fan duct inlet and the spillage flow M over the external surface of the fan casing. This enables the external depth of the lip 40 to be reduced, due to the reduced spillage flow, whilst retaining the spillage flow over the fan casing without separation. This in turn leads to a relatively thin and shorter fan casing, which will reduce engine weight, and because of the relatively short fan casing the drag values are considerably reduced.

The contoured first portion of the core casing enables the maximum performance to be obtained with a smaller overall fan casing outer diameter.

We claim:
1. A turbofan gas turbine engine comprising a core engine and a fan assembly, the core engine having a downstream end and a core casing, the fan assembly being positioned at one of the downstream end of the core engine and downstream of the core engine, the fan assembly comprising at least one fan and a fan casing, the fan casing defining in part a fan duct, the at least one fan operating coaxially within the fan duct, the fan duct having an upstream end, the fan duct having an inlet at its upstream end, the core casing having an inlet for air to the core engine and having a first portion positioned upstream of the fan duct inlet, the first portion of the core casing being aerodynamically contoured from the core engine inlet to a maximum diameter upstream of the fan duct inlet which in at least one mode of operation constitutes a means for affecting the air flow streamlines in the vicinity of the fan duct inlet and causing the bounding stream tube of air entering the fan duct inlet to adopt a flow path which is in near alignment with the length of the fan casing prior to reaching said fan casing, the core casing having a second portion, downstream from the first portion, the second portion being aerodynamically contoured from a maximum diameter corresponding to the maximum diameter at the downstream end of the first portion to a minimum diameter substantially in the same plane as the fan duct inlet, the core casing having a third portion, downstream from the second portion, the third portion being aerodynamically contoured from a minimum diameter corresponding to the minimum diameter at the downstream end of the second portion to a continually increasing diameter substantially at the at least one fan, the fan casing having a lip at the upstream end, the lip having an internal diameter, the internal diameter of the lip being smaller than he internal diameter of the rest of the fan casing, the lip being located at the plane containing the minimum diameter of the core casing between the first portion and the second portion of the core casing, the lip having a relatively small external depth to produce a relatively thin and short fan casing, the lip being aerodynamically contoured to retain the spillage flow of air over the fan casing without separation in the at least one mode of operation, the lip having a maximum internal depth and being aerodynamically contoured to retain the internal flow of air over the fan casing without separation in another mode of operation, said lip having a radial thickness that varies from a minimum at the leading edge thereof to a maximum thickness in the plane of minimum diameter of said core casing to another minimum downstream of said plane and adjacent said at least one fan to thereby minimize the diameter of the fan casing.

* * * * *